(12) United States Patent
Luthra et al.

(10) Patent No.: US 12,373,184 B2
(45) Date of Patent: Jul. 29, 2025

(54) MANAGING END-TO-END ONBOARDING OF APPLICATION BUNDLES

(71) Applicant: Rakuten Mobile, Inc., Tokyo (JP)

(72) Inventors: Mohit Luthra, Singapore (SG); Pankaj Garg, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/000,098

(22) PCT Filed: Sep. 27, 2022

(86) PCT No.: PCT/US2022/044817
§ 371 (c)(1),
(2) Date: Nov. 28, 2022

(87) PCT Pub. No.: WO2024/072375
PCT Pub. Date: Apr. 4, 2024

(65) Prior Publication Data
US 2024/0231783 A1   Jul. 11, 2024

(51) Int. Cl.
| | |
|---|---|
| *G06F 8/61* | (2018.01) |
| *G06F 8/30* | (2018.01) |
| *G06F 8/41* | (2018.01) |
| *G06F 8/60* | (2018.01) |
| *G06F 9/445* | (2018.01) |
| *G06F 9/451* | (2018.01) |

(Continued)

(52) U.S. Cl.
CPC ............. *G06F 8/60* (2013.01); *G06F 9/451* (2018.02)

(58) Field of Classification Search
CPC ... G06F 8/60; G06F 9/451; G06F 8/61; G06F 8/31; G06F 8/71; G06F 8/47; G06F 8/64; G06F 9/4486; G06F 9/44521; G06F 16/16; G06F 9/44536; G06F 8/41; G06F 8/51; G06F 9/453; G06F 3/0483; G06F 3/04845; G06F 8/38; G06F 3/0482; G06F 8/34; G06F 8/35; G06F 8/36; G06F 16/958; G06F 8/30; G06F 8/447; G06F 16/2264; G06F 16/283; G06F 16/2246; G06F 8/65; G06F 9/4451; G06F 9/4482; H04L 67/34; G06N 20/00
See application file for complete search history.

(56) References Cited

U.S. PATENT DOCUMENTS 11,698,968 B2 * 7/2023 Simon .................... G06F 8/61
726/22
12,164,898 B2 * 12/2024 Wallis ................ G06F 11/3698
(Continued)

*Primary Examiner* — Thuy Dao
(74) *Attorney, Agent, or Firm* — HAUPTMAN HAM, LLP

(57) ABSTRACT

Management of end-to-end onboarding of application bundles is described. A dashboard user interface is presented for displaying information associated with at least one application bundle component and presenting a dashboard menu on the dashboard user interface for selecting the at least one application bundle component to create. A selection of the at least one application bundle component to create is received via the dashboard menu. Based on the selection, a creation user interface including a selectable control component to initiate creation of the at least one application bundle component is displayed. In response to receiving selection of the selectable control component, the at least one application bundle component is created.

15 Claims, 16 Drawing Sheets

(51) Int. Cl.
*G06F 9/455* (2018.01)
*G06F 11/36* (2025.01)

(56) References Cited

U.S. PATENT DOCUMENTS

2005/0273779 A1    12/2005  Cheng et al.
2007/0271552 A1*   11/2007  Pulley .................... G06F 9/453
                                                       717/120
2017/0322787 A1*   11/2017  Patidar ...................... G06F 8/61

* cited by examiner

Service Designer — 402
Services

| | | Search Services | Provide Feedback | |
| --- | --- | --- | --- | --- |
| | | | Services ▽ | |

Displaying X of Y Results

⊞ Add New — 426
430

| Service Name | Tags — 414 | Created On — 418 | Updated On — 422 | |
| --- | --- | --- | --- | --- |
| SanityService1jan27 | SanityService1jan27 | Year/mo/day Hr:Min:Secs pm | Year/mo/day Hr:Min:Secs pm | ... |
| sanityservicetesting24jan | | Year/mo/day Hr:Min:Secs pm | Year/mo/day Hr:Min:Secs pm | ... |
| SanityService1jan11 | SanityService1jan11 | Year/mo/day Hr:Min:Secs pm | Year/mo/day Hr:Min:Secs pm | ... |
| newservice1 | tag1 | Year/mo/day Hr:Min:Secs pm | Year/mo/day Hr:Min:Secs pm | ... |
| sudhanshuservice1 | tag1, tag | Year/mo/day Hr:Min:Secs pm | Year/mo/day Hr:Min:Secs pm | ... |
| myservice1613 | a, a, a, a, a, a, a, a, | Year/mo/day Hr:Min:Secs pm | Year/mo/day Hr:Min:Secs pm | ... |
| 444 | | Year/mo/day Hr:Min:Secs pm | Year/mo/day Hr:Min:Secs pm | ▪ |
| testServiceDec17 | tag1 | Year/mo/day Hr:Min:Secs pm | Year/mo/day Hr:Min:Secs pm | ... |
| SanityServiceDec 17 | SanityServiceDec 17 | Year/mo/day Hr:Min:Secs pm | Year/mo/day Hr:Min:Secs pm | ... |
| SanityServiceDec17 | SanityServiceDec17 | Year/mo/day Hr:Min:Secs pm | Year/mo/day Hr:Min:Secs pm | ... |
| Service1dec14 | Service1dec14 | Year/mo/day Hr:Min:Secs pm | Year/mo/day Hr:Min:Secs pm | ... |
| boxHEDEC8 | boxHEDEC8 | Year/mo/day Hr:Min:Secs pm | Year/mo/day Hr:Min:Secs pm | ... |

Service Designer Services | Provide Feedback | Search Services

Displaying X of Y Results — 614

| Vendor Name | Key | Website | Type | Address | City | State | Zip | Country |
|---|---|---|---|---|---|---|---|---|
| ☐ Vendorstageonly | 145 | | Partner | Vendorstageonly | Vendorstageonly | Vendorstageonly | 120022 | Vendorst... 610 |
| ☐ new | key566 | https://www.goog... | Partner | address | panchkula | haryana | Preview | |
| ☐ XYZVendor | 8c-8b2-96... | https://www.goog... | Partner | kanpur | Kanpur | UP 622 | View Users | |
| ☐ VendorName | VendorName | | Partner | VendorName | VendorName | VendorName | Edit | |
| ☐ SFPartnerNew | 333 | | Partner | 222 | ased | asd | Delete | |
| ☐ CompanyProvider | 555 | | Partner | test | test | test | 123123 — 620 | test |
| ☐ PartnerSF | 21 | | Partner | delhi | delhi | delhi | 133333 | delhi |
| ☐ ProviderSF | 20 | | Partner | chd | chd | chd | 123333 | india |
| ☐ testpartner | testpartner | | Partner | asasd | chd | chd | 1313 | india |

Services ▽  [+]

| | NO | X | Services ▽ |
|---|---|---|---|

Service ID ~1103
123abcdef-abcdef-123456 ~1104   Tags —   Created On ~1105   1106~Created By   Vendor~1108
                                          Year/mo/day Hr:Min:Secs pm 1107~System   Vendor Name~1109

| Overview | Release | Bundles 1102 1134 | Artifacts 1110 | Members 1130 1116 | Request 1118 | Infrastructure 1130 | Activity 1150 |
|---|---|---|---|---|---|---|---|

Displaying 25 of 142 Results

| Phase ~1112 | Status ~1114 | Bundle Name | Type ~1136 | Type1 1138~1.0.0.0 | Bundle Version 1140~2022/02/01 07:14:07 pm | Created On 1160 |
|---|---|---|---|---|---|---|
| Active | Complete | Bundlename123 | Type1 | Slice | 1.0.0.0 | 202... View |
| In Design | Action Required | slice31jan21 | Type 1 | Slice | 1.0.0.0 | 202... Type 1 Bundle |
| In Design | Draft | Rob14jan21 | Type 1 | Slice | 1.0.0.0 | 202... Type 2 Bundle 1162 |
| In Design | Draft | slice12jan21 | Type 2 ~1144 | Type 1 | 1.0.0.0 | 202... Trigger Development |
| In TEST-Sbx | In Progress 1142 ~ | slice11jan21 | | | | 2022/02/01 07:14:07 pm |
| Active | Complete | rlsontest | | | | |
| | | Rob23jan21 | | | | |

In Test-SBX ~1132

FIG. 11

| Service Designer Services > NO | | NO | X | Services ▽ | | |
|---|---|---|---|---|---|---|
| Service ID ~1203 123abcdef-abcdef-123456 ~1204 | | Tags ~1202 | Created On ~1205 Year/mo/day Hr:Min:Secs pm ~1207 | 1206~ Created By System | Vendor ~1208 Vendor Name ~1209 | |
| Overview | Release | Bundles | Artifacts | Members | Request | Infrastructure | Activity |

| Displaying 25 of 142 Results ~1214 | | 1210 1230 1216 | | 1218 | 1230 [+] | |
|---|---|---|---|---|---|---|
| Phase ~1212 | Status | Bundle Name | Type ~1236 | Bundle Version 1238~ | Created On 1240~ | 1260 1250 |
| In Test-SBX ~1232 | Action Required | Bundlename123 | Type1 | 1.0.0.0 | 2022/02/01 07:14:07/pm | |
| Active | Complete | slice31jan21 | Slice | 1.0.0.0 | 202 | View |
| In Design | Action Required | Rob14jan21 | Type 1 | 1.0.0.0 | 202 | Type 1 Bundle |
| In Design | Draft | slice12jan21 | Slice | 1.0.0.0 | 202 | |
| In Design | Draft | slice11jan21 | Slice | 1.0.0.0 | 202 | Type 2 Bundle |
| In TEST-sBX | In Progress 1242~ | rlsontest 1244~ | Type 2 | 1.0.0.0 | 202 | Trigger QA ~1262 |
| Active | Complete | Rob23jan21 | Type 1 | 1.0.0.0 | 2022/02/01 07:14:07 pm | |

MANAGING END-TO-END ONBOARDING OF APPLICATION BUNDLES

RELATED APPLICATIONS

The present application is a National Phase of International Application No. PCT/US2022/044817, filed Sep. 27, 2022.

TECHNICAL FIELD

This description relates to a system, method, and non-transitory computer-readable media for managing end-to-end onboarding of application bundles.

BACKGROUND

Newly developed software or applications go through an onboarding process that includes at least one of quality testing, verification, and certification. The quality testing, verification, and certification of application bundles during the onboarding process improves the software adoption process. An application bundle is a collection of artifacts used to deploy and manage an application.

The onboarding process used to deliver and integrate applications is a difficult and time consuming process that involves multiple vendors, multiple services, multiple approval managers, and many steps that a developer performs before an application is ready for deployment by users. The steps involved in the onboarding process are currently performed manually. Manual communication occurs between many people, many files are located and used during the onboarding process, and multiple tickets are raised to get an application onboard. Coordination among parties involved in the onboarding process decreases the efficiency and consumes more amount of time. Understanding infrastructure and a lack of automated deployments causes delays to market. Manual integration, communication, and integration with multiple teams, such as Cloud, Network, Security, and Infrastructure managers leads to increases cost. A lack of automated testing and security standardization leads to comprised quality.

SUMMARY

In at least embodiment, a method for managing end-to-end onboarding of application bundles includes presenting a dashboard user interface displaying information associated with at least one application bundle component and presenting a dashboard menu on the dashboard user interface for selecting the at least one application bundle component to create, receiving, via the dashboard menu, a selection of the at least one application bundle component to create, based on the selection, displaying a creation user interface including a selectable control component to initiate creation of the at least one application bundle component, and in response to receiving selection of the selectable control component, creating the at least one application bundle component.

In at least one embodiment, a device for managing onboarding of application bundles includes a memory storing computer-readable instructions, and a processor connected to the memory, wherein the processor is configured to execute the computer-readable instructions to present a dashboard user interface displaying information associated with at least one application bundle component and presenting a dashboard menu on the dashboard user interface for selecting the at least one application bundle component to create, receive, via the dashboard menu, a selection of the at least one application bundle component to create, based on the selection, display a creation user interface including a selectable control component to initiate creation of the at least one application bundle component, and in response to receiving selection of the selectable control component, create the at least one application bundle component.

In at least one embodiment, a non-transitory computer-readable media having computer-readable instructions stored thereon, which when executed by a processor causes the processor to perform operations including presenting a dashboard user interface displaying information associated with at least one application bundle component and presenting a dashboard menu on the dashboard user interface for selecting the at least one application bundle component to create receiving, via the dashboard menu, a selection of the at least one application bundle component to create, based on the selection, displaying a creation user interface including a selectable control component to initiate creation of the at least one application bundle component, and in response to receiving selection of the selectable control component, creating the at least one application bundle component.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 4 illustrates a Services Creation UI according to at least one embodiment.

FIG. 6 illustrates User Creation UI according to at least one embodiment.

FIG. 8 illustrates a Type 1 Bundle Creation UI according to at least one embodiment.

FIG. 10 illustrates a Bundel Review Approval Verification Window according to at least one embodiment.

FIG. 11 illustrates trigger deployment from an Updated Bundle Status UI according to at least one embodiment.

FIG. 12 illustrates triggering QA scans from an Updated Bundle Status UI according to at least one embodiment.

FIG. 13 illustrates a Status Check UI according to at least one embodiment.

DETAILED DESCRIPTION

Figure 1:
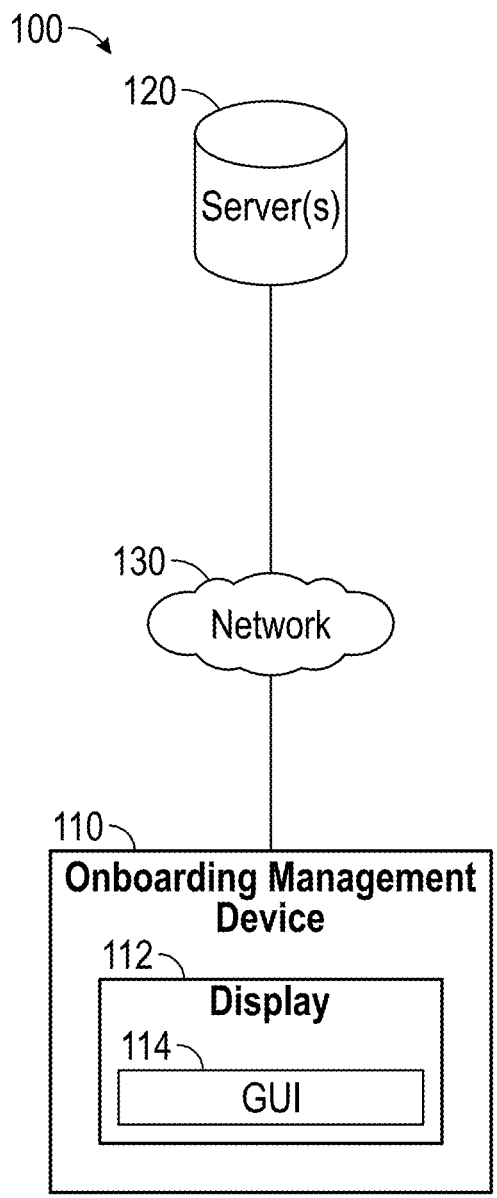
FIG. 1 illustrate a system for managing end-to-end onboarding of application bundles according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

The terminology used in the description of the various described embodiments herein is for the purpose of describing particular embodiments and is not intended to be limiting. As used in the description of the various described embodiments and the appended claims, an onboarding management device implements at least one graphical user interface (GUI) that is presented on a display device. The at least one GUI is described with references to objects or graphical elements including one or more windows, pages, icons, dialogs, tabs, check boxes, edit boxes, text labels, label buttons, radio buttons, sliders, drop-down menus or lists, and text boxes. Those skilled in the art recognize that the description, number, visual representation, and other characteristics of the GUI elements are presented as examples and are not intended to be limiting.

In at least one embodiment, management of end-to-end onboarding of application bundles is provided by presenting a dashboard user interface displaying information associated with at least one application bundle component and presenting a dashboard menu on the dashboard user interface for selecting the at least one application bundle component to create, receiving, via the dashboard menu, a selection of the at least one application bundle component to create, based on the selection, displaying a creation user interface including a selectable control component to initiate creation of the at least one application bundle component, and in response to receiving selection of the selectable control component, creating the at least one application bundle component.

Advantages of the integrated onboarding management device includes providing a single point for managing the end-to-end onboarding of application bundles. Items and information are gathered in a single point, and then the information is distributed automatically to downstream systems. Automatic email notification are provided to and from managers involve in multiple approval decisions. A graphical user interface (GUI) allows a user to design and upload an application bundle using simple drag and drop features. The onboarding system provides an orchestrated process presented through the GUI that allows an application developer to design an end-to-end application bundle. From the GUI, the developer chooses various parameters, and creates or uploads an application bundle to the system. The building of different types of bundles, including Type 1 bundles and Type 2 bundles, are supported. The drag and drop capabilities allow the end-to-end onboarding process to be managed from a single platform FIG. 1 illustrate a system 100 for managing end-to-end onboarding of application bundles according to at least one embodiment.

In FIG. 1, an Onboarding Management Device 110 is provided. Onboarding Management Device 110 includes a Display 112 and presents a Graphical User Interface (GUI) that enables a user to design and upload an application bundle using simple drag and drop features. The Onboarding Management Device 110 provides an orchestrated process presented through the GUI 114 that allows an application developer to design an end-to-end application bundle. From the GUI 114, the developer chooses various parameters, and creates or uploads an application bundle to the system. The building of different types of bundles, including Type 1 bundles and Type 2 bundles, are supported. The drag and drop capabilities allow the end-to-end onboarding process to be managed from a platform. Items and information are gathered in a single point through a detailed intake user interface (UI) accessible through the GUI 114, and then the information is distributed automatically to Server(s) 120 through Network 130.

In at least one embodiment Server(s) 120 include one or more servers located in a location. In at least one embodiment, Server(s) 120 include one or more servers distributed across a plurality of locations. Onboarding Management Device 110 exchange automatic email notifications with one or more managers involve in multiple approval decisions during the onboarding lifecycle.

GUI 114 presents a dashboard user interface that enables a user to access status information and identification of recent services and bundles. GUI 114 also enables a user to access a summary of services including a list of services and associated information. Through GUI 114, new services and bundles are created by providing details through a detailed intake UI to define a service and a bundle, respectively. The detailed intake UI enable a user to select different roles and various parameters, configuration files, and scripts. Further, GUI 114 enables a user to create new users, vendors, and artifacts. GUI 114 enables a bundle summary to be accessed, including a phase and a status of the bundle. A user of the Onboarding Management Device 110 uses GUI 114 to review new bundles. In response to being rejecting, the developer is provided changes to be made to the application bundle, wherein the application bundle is moved to a draft stage for making changes before resubmitting the application using user interfaces provided via GUI 114. In response to being approved, the application bundle is registered on a service catalog for deployment. A service catalog is able to be maintained at Server(s) 120. After deployment, a developer triggers QA scans that are defined by the user via the Onboarding Management Device 110. After scans have completed, GUI 114 enables a user to access a self-certification menu. Upon submission of self-certification, a release request will be created and a release request number is displayed on GUI 114. Automated processes of the Onboarding Management Device 110 fetch the status of the release request. Based on the status of the release request, a user registers the application bundle on a stage service catalog and the bundle becomes production ready. Activity logs are presented via GUI 114.

In at least one embodiment, the Onboarding Management Device 110 is implemented in a standalone system. In at least one embodiment, the Onboarding Management Device 110 is implemented using a distributed computing model that allows two or more distributed or co-located computing devices to coordinate their activities in order to achieve the management of end-to-end onboarding of application bundles. This coordination may occur via a network (e.g., a local area network, a wide area network, and/or the Internet) or some other form of communicative coupling. With the continued reduction in costs of computer storage (e.g., random access memory, solid state memory, and hard drives) and always-on, networking computing devices (e.g., personal computers (PCs), laptops, tablet devices, and cell phones), new techniques can be employed to take advantage of distributed computing systems.

In particular, cloud-based computing is a term that can refer to distributed computing architectures in which the data and program logic for a cloud-based application are shared between one or more client devices and server devices on a near real-time basis. Parts of this data and program logic may be dynamically delivered, as needed or otherwise, to various clients accessing the cloud-based application. For example, Server(s) 120 are capable of storing data and program logic for implementing the Onboarding Management Device 110 in a cloud-based computing architecture. Details of the architecture may be transparent to the users of client devices. Thus, a PC user accessing a cloud-based application may not be aware that the PC downloads program logic and/or data from the server devices, or that the PC offloads processing or storage functions to the server devices.

Figure 2:
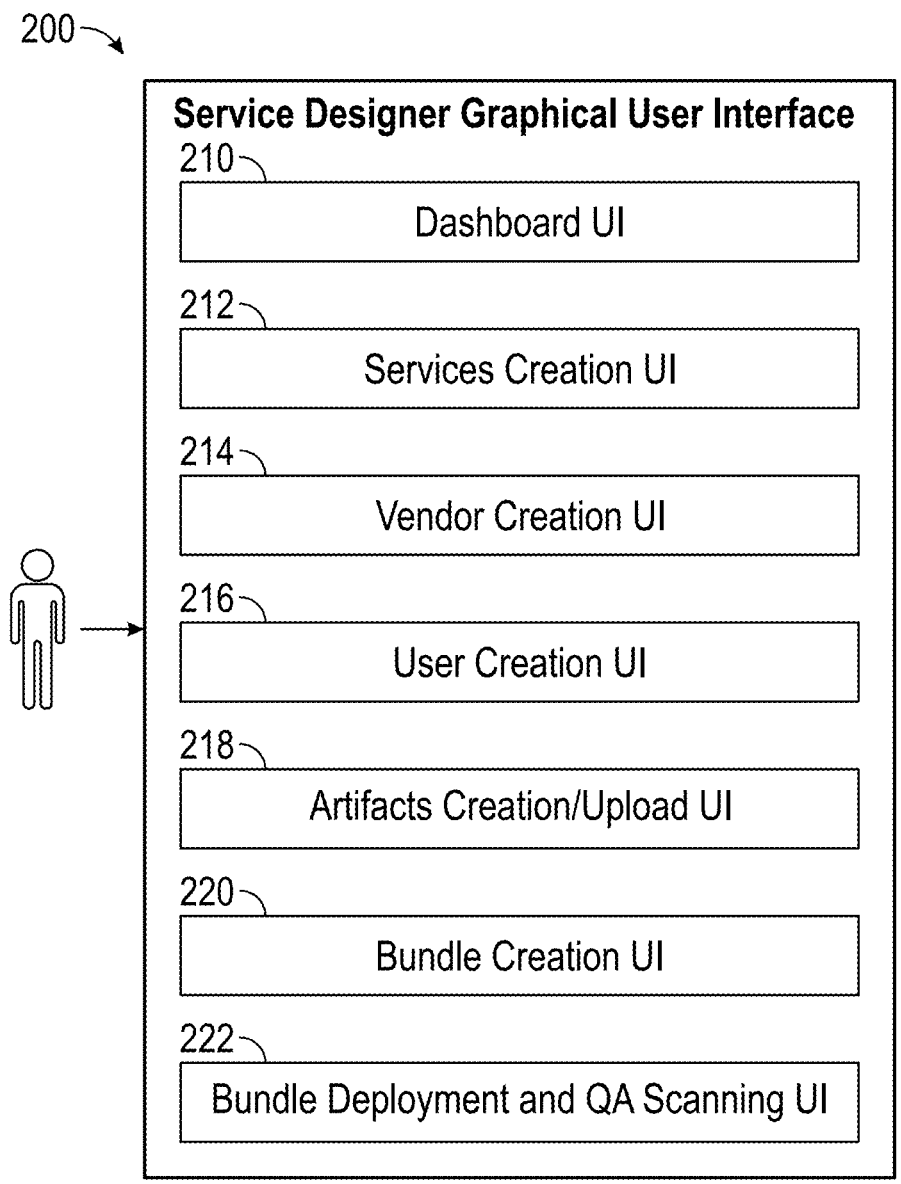
FIG. 2 illustrates a Service Designer GUI according to at least one embodiment.

FIG. 2 illustrates a Service Designer GUI 200 according to at least one embodiment.

In FIG. 2, a user uses Service Designer GUI 200 to access a Dashboard UI 210, a Services Creation UI 212, a Vendor Creation UI 214, a User Creation UI 216, an Artifacts Creation/Upload UI 218, a Bundle Creation UI 220, and a Bundle Deployment and QA Scanning UI 222.

Dashboard UI 210 provides options for creation of application bundle components, such as services, vendors, users, artifacts and bundles. Dashboard UI 210 also provides information to the user about the different bundle components. From Dashboard UI 210, a user is able to initiate the creations of services by causing Services Creation UI 212 to be displayed. Services Creation UI 212 displays information about existing services and has a selectable component to add a new service. From Dashboard UI 210, a user is able to initiate the creations of vendors by causing Vendors Creation UI 214 to be displayed. Vendors Creation UI 214 displays information about existing vendors and has a selectable component to add a new vendor. Users Creation UI 216 is activated using a menu accessible from Vendors Creation UI 214. User Creation UI 216 enables a user to enter data about a user, edit such data, or otherwise configure a user.

Artifacts Creation/Upload UI 218 is activated from a summary page having selectable tabs including artifacts. Artifacts Creation/Upload UI 218 presents a selectable component to initiate creation of an artifact. Bundle Creation UI 220 is displayed in response to clicking on a bundle tab in the summary page. From the Bundle Creation UI 220 a user is able to create a new Type 1 bundle or a Type 2 Bundle. Bundle Deployment and QA Scanning UI 222 is presented by selecting a menu item form the summary page.

The Dashboard UI 210, Services Creation UI 212, Vendor Creation UI 214, Users Creation UI 216, Artifacts Creation/Upload UI 218, Bundle Creation UI 220, and Bundle Deployment and QA Scanning UI 222 are described in more detail below.

Figure 3:
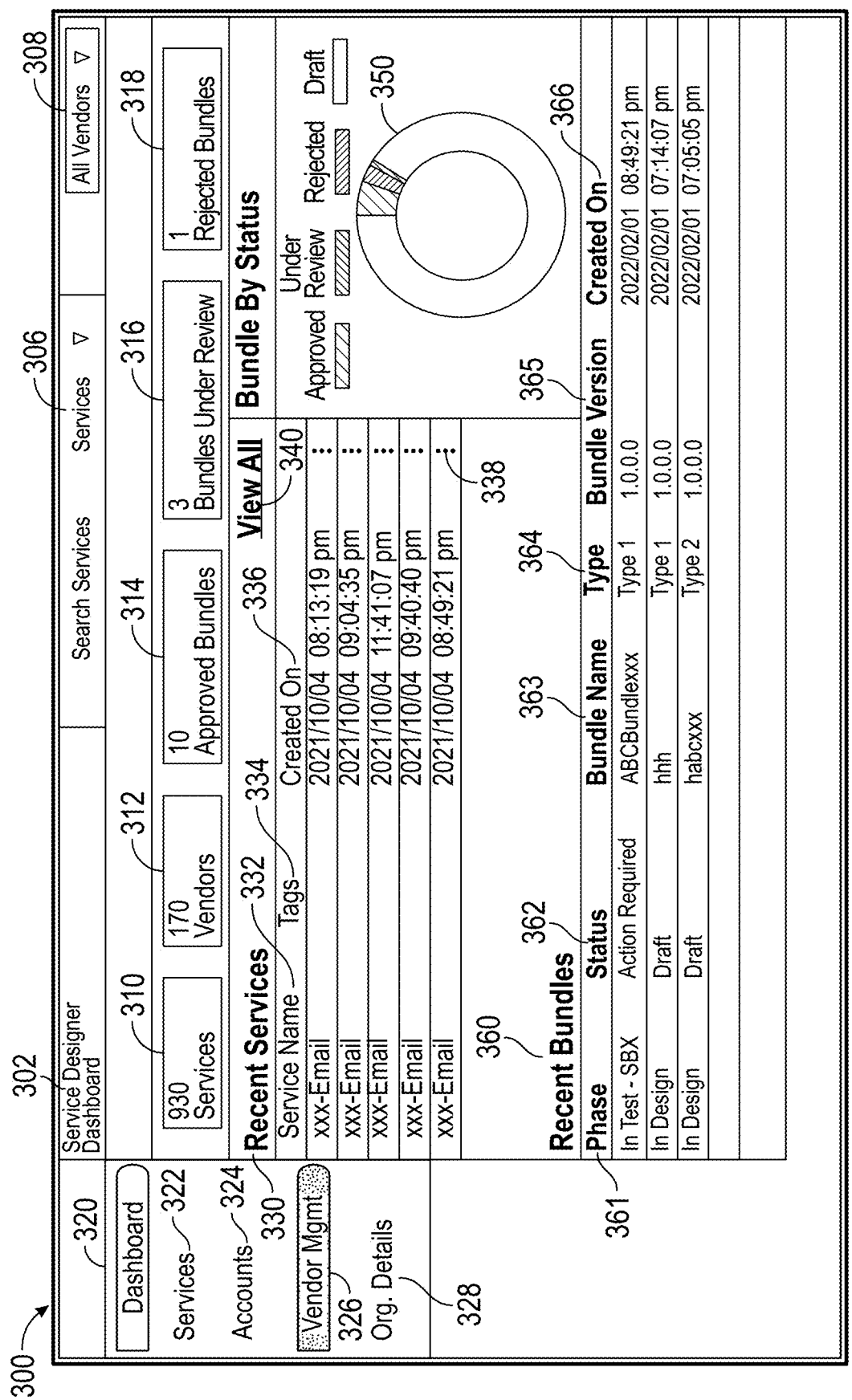
FIG. 3 illustrates a Dashboard User Interface according to at least one embodiment.

FIG. 3 illustrates a Dashboard User Interface 300 according to at least one embodiment.

In FIG. 3, the Dashboard User Interface 300 is accessed from Service Designer 302 and provides a pull-down menu 306 for selecting a bundle component to create, such as services. A second pull-down menu 308 enables a user to select vendors. Dashboard User Interface 300 provides information, such as a count of total Services 310, Vendors 312, Approved Bundles 314, Bundles Under Review 316, and Rejected Bundles 318.

FIG. 3 illustrates Options Menu 320 that is accessible from the Dashboard UI 300. In FIG. 3, Options Menu 320 includes a Services Option 322, an Accounts Option 324, Vendor Management Option 326, and Organization Details Option 328. Dashboard User Interface 300 also presents a list of Recent Services 330. The list of Recent Services includes Service Names 332, Tags 334, a Created On date 336. A Kabob Icon 338 enable a user to edit a recent service.

The user is also able to select View All 340 to view all Recent Services 330. A graphical representation of the status of bundles in presented, for example, using a donut chart 350.

Dashboard UI 300 also presents Recent Bundles 360. Under Recent Bundles 360, a Phase 361, a Status 362, a Bundle Name 363, a Type 364, a Bundler Version 365 and a Created On date 366 are presented for recent bundles.

FIG. 4 illustrates a Services Creation UI 400 according to at least one embodiment.

In FIG. 4, the Services Creation UI 400 is presented upon selection of the services menu from the Dashboard UI 300 of FIG. 3. Services Creation UI 400 shows that the Services Creation UI 400 is provided by Service Designer 402.

For a Service Name 410, Tags 414, a Created On 418 date, and Updated On date 422. Created On date 418 indicates the date that the service was created. The Updated On date 422 indicates the date the service was updated. An "+Add New" Button 426 is provided for adding a new service. Once the "+Add New" Button 426 is selected, creation of a service is initiated and a details intake UI is presented, which include a service details intake page so the user can enter data or otherwise configure a new service. Kabob Icon 430 enable a user to edit a service. Pull-down menu 406 is provided for selecting an application bundle component, such as services.

Figure 5:
FIG. 5 illustrates a Vendors Creation UI according to at least one embodiment.

FIG. 5 illustrates a Vendors Creation UI 500 according to at least one embodiment.

In FIG. 5, the Vendors Creation UI 500 is presented by selecting Vendor Management Option 326 on the Options Menu 320 of FIG. 3. The Vendors Creation UI 500 displays a list of vendors by Vendor Name 510. For a Vendor Name 510, a Key 512, a Website 514, a Type 516 for the vendor, an Address 518, a City 520, a State 522, a Zip 524, and a Country 526 are provided. Kabob Icon 530 enable a user to edit a vendor listed in the list of vendors. A user selects the "+Add New" Button 540 to add a new vendor. Once the "+Add New" Button 540 is selected, creation of a vendor is initiated and a details intake UI is presented, which include a vendor details intake page so the user can enter data or otherwise configure a new vendor.

FIG. 6 illustrates User Creation UI 600 according to at least one embodiment.

In FIG. 6, the Kabob Icon 610 for a Vendor Name 614 is selected and an Options Menu 620 is presented. From the Options Menu 620, the user is able to select View User Option 622. The View User Option 622 initiates display of a detail intake UI, which includes a user details intake page so the user can enter data or otherwise configure a new user associated with the Vendor Name 614.

Figure 7:
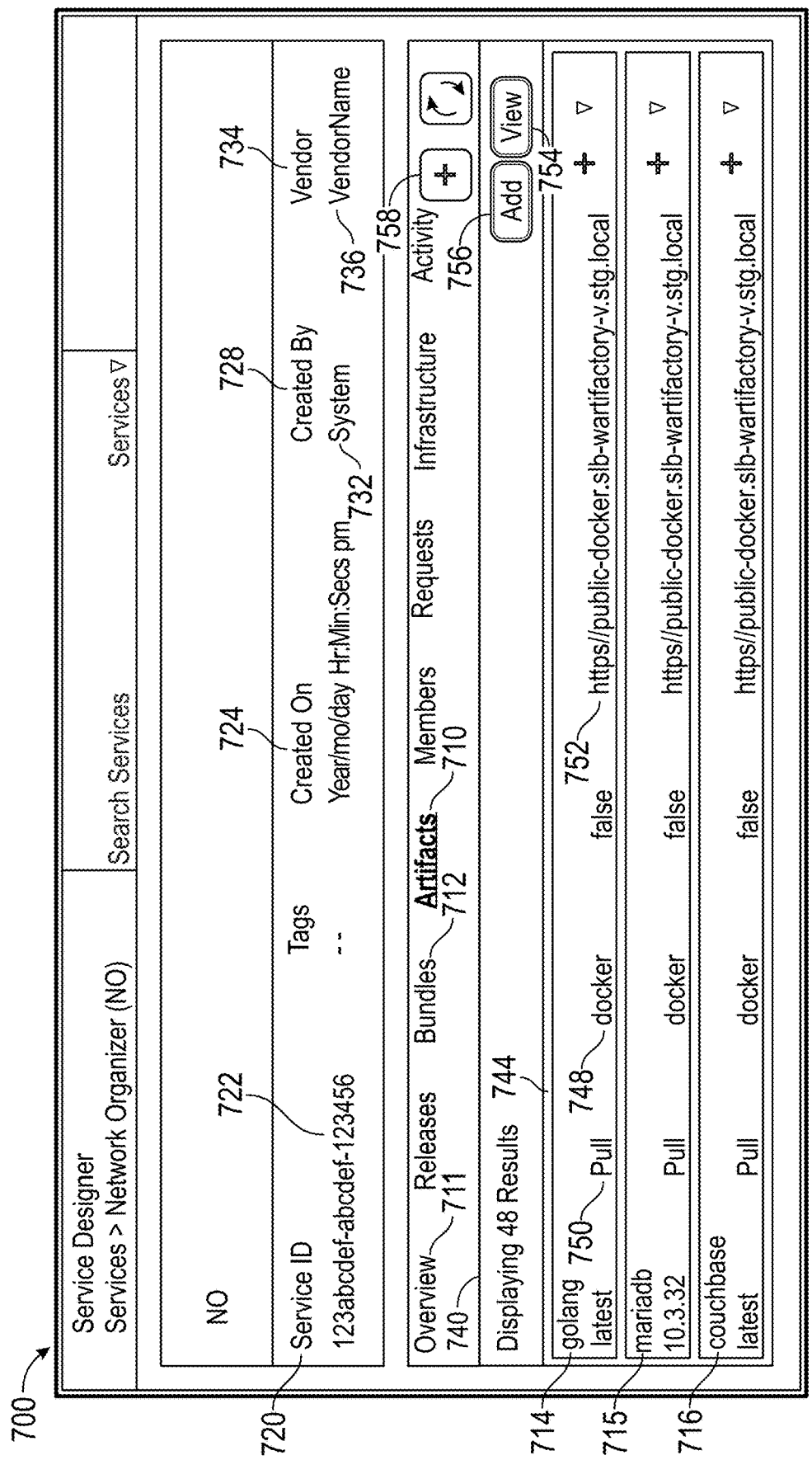
FIG. 7 illustrates an Artifact Creation UI according to at least one embodiment.

FIG. 7 illustrates an Artifact Creation UI 700 according to at least one embodiment.

In FIG. 7, Artifacts Tab 710 has been selected. Artifacts 714, 715, 716 are show for Service ID 720 of 123abcdef-abcdef-123456 722 having a Created On date 724. Service ID 720 of 123abcdef-abcdef-123456 722 has a Created By date 728, identification of Created By 728 indication creation by System 732. The Vendor 734 is identified as VendorName 736. Prior to creating an application bundle, artifacts are uploaded using one of three methods. Docker Pull involves pulling the image from a public docker and uploading the image on an artifactory. Docker Push involves the user uploading a docker image from a user's local system and pushing the image to JFrog artifactory in a folder suggest by the Service Designer.

JFrog Pull pulls the image from one location to another JFrog location.

In FIG. 7, 48 results 740 for artifacts are returned with Artifacts 714, 715, 716 shown in the Artifact Window 744. For example, Artifact 714 is named golang. The type for Artifact 714 is Docker 748 and the artifact image was Pulled 750 from a public docker at location https//public-docker.slb-artifactory-v.stg.local 752. An artifact in Artifact Window 744 is able to be selected and View 754 selected to view details of the selected artifact. To add a new artifact from the Artifact Creation UI 800, a user selects the "+" Button 756.

Once the "+" Button 756 is selected, creation of an artifact is initiated and a details intake UI is presented, which include an artifact details intake page so the user can enter data or otherwise configure a new service. A user is able to select Overview 711 to present a summary of information. A user is able to select Bundle Tab 712 in Artifact Creation UI 700 and then click the "+" Button 758 to initiate creation of a bundle.

Create A Type 1 Bundle

Figure 8:
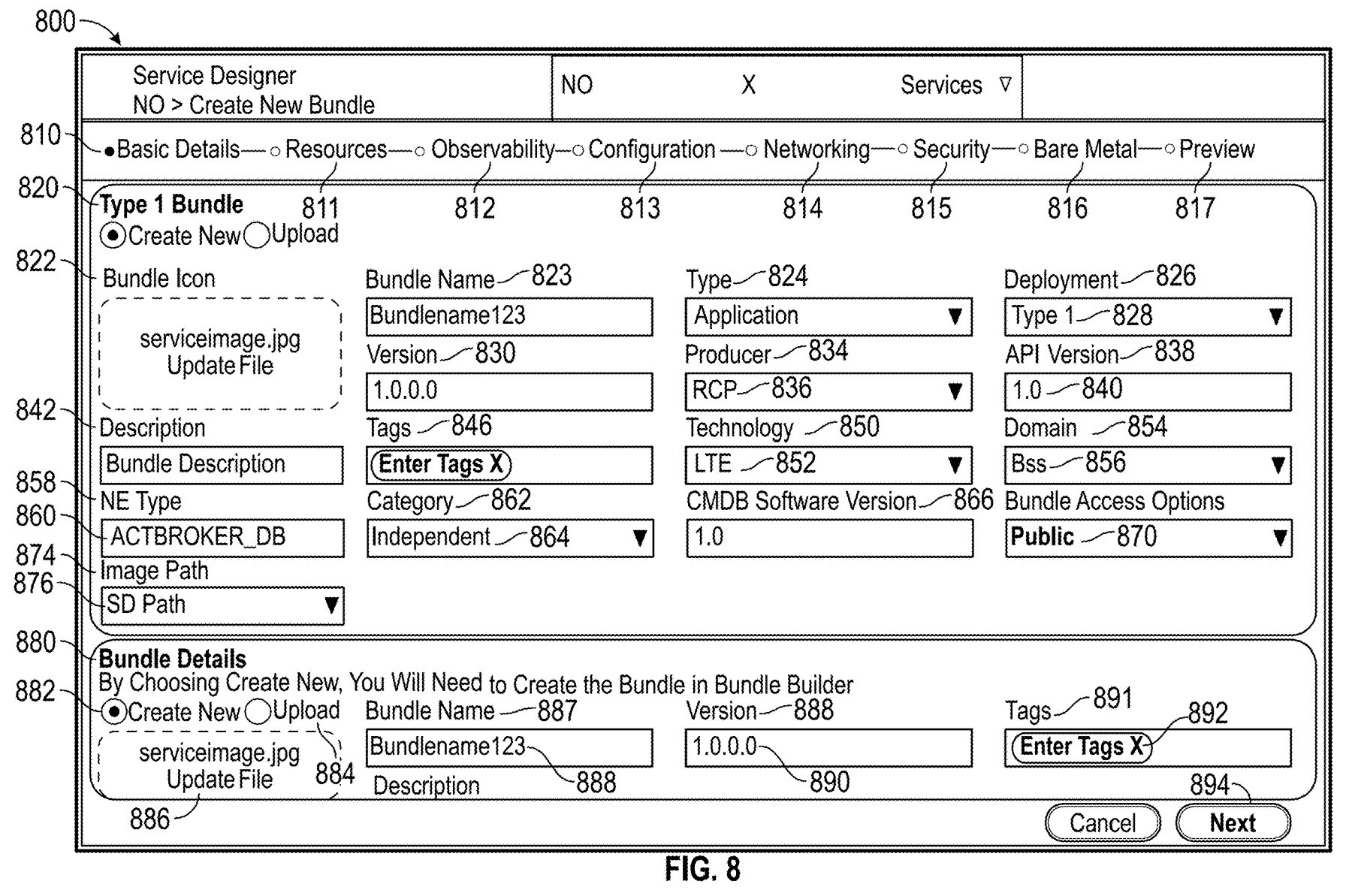

FIG. 8 illustrates a Type 1 Bundle Creation UI 800 according to at least one embodiment.

The Type 1 Bundle Creation UI 800 is displayed in response to clicking on Bundle Tab 712 in Artifact Creation UI 700 shown in FIG. 7, and then clicking the "+" Button 758. In FIG. 8, the Type 1 Bundle Creation UI 800 is for adding a Type 1 bundle. A Type 1 bundle is a bundle that is specific for a particular company. A Type 2 bundle conforms to industry standards for exposing applications. Type 1 Bundle Creation UI 800 displays stages for the data entry, including Basic Details entry 810, Resources entry 811, Observability data entry 812, Configuration data entry 813, Networking data entry 814, Security data entry 815, Bare Metal entry 816, and a Preview stage 817.

In FIG. 8, Basic Details 810 for a Type 1 Bundle 820 are entered. Data entry for Resources 811, Observability 812, Configuration 813, Networking 814, Security 815, Bare Metal 816 are discussed below with reference to Type 1 Bundle Intake 1418 of FIG. 14. For Basic Details 810, an image is uploaded at area associated with Bundle Icon 814. The Bundle Name Window 823 is used to enter the appropriate name of the bundle. Type Window 824 indicates whether the bundle is an application bundle, network service bundle, or network slice. The Deployment Window 826 has a drop-down menu for choosing Type 1 or Type 2. In FIG. 8, Type 1 828 is chosen.

The Version Window 830 indicates the version of the Type 1 bundle. The Producer Window 834 has a drop-down menu. Here, RCP 836 is shown being selected. The API Version 838 is shown as 1.0 840. The Description Window 842 includes a brief description of the bundle. Tags Window 846 allows entry of tags for performing lookups and searches.

The Technology Window 850 is a drop-down menu allowing selection of the appropriate technology. Here, LTE 852 is selected. The Domain Window 854 shows Bss 856 for the domain. The NE Type Window 858 shows ACTBROKER_DB 860 identifying provision for the type of NE. The Category Window 862 indicates Independent 864. Independent 864 is selected in response to there not being any dependency on any other bundle. Network Service Dependent (not shown here) is selected in response to creation of a Network Service bundle. A Configuration Management Database (CMDB) Software Version Window 866 indicates the version of the CMDB software for managing the bundle. Bundle Access Option Window 870 indicates whether the accessibility of the bundle is public or private. Image Path Window 874 indicates the path for the image. "SD Path" 876 that is chosen to pull from the JFrog, and "Custom Path" (not shown here) is chosen to provide the path for the artifactory.

A Bundle Details Window 880 includes a Create New 882 and Upload 884 option. Here, Create New 882 has been selected. A drag and drop area 886 is provided for uploading a Type 2 bundle. A Bundle Name window 887 is provided for entering the bundle name, e.g., Bundlename123 888. A Version window 889 is provide for entering the version for the file, e.g., 1.0.0.0 890. Tags window 891 is provided for entering tags 892.

After the details in the Type 1 Bundle Creation UI 800 have been entered, the user then clicks Next 894. After clicking Next 894 a Details Intake UI 1400 as shown below with respect to FIG. 4 is presented, which includes a Type 1 Bundle Intake page 1418 so the user can enter further data or otherwise configure the Type 2 bundle.

Create A Type 2 Bundle

Figure 9:
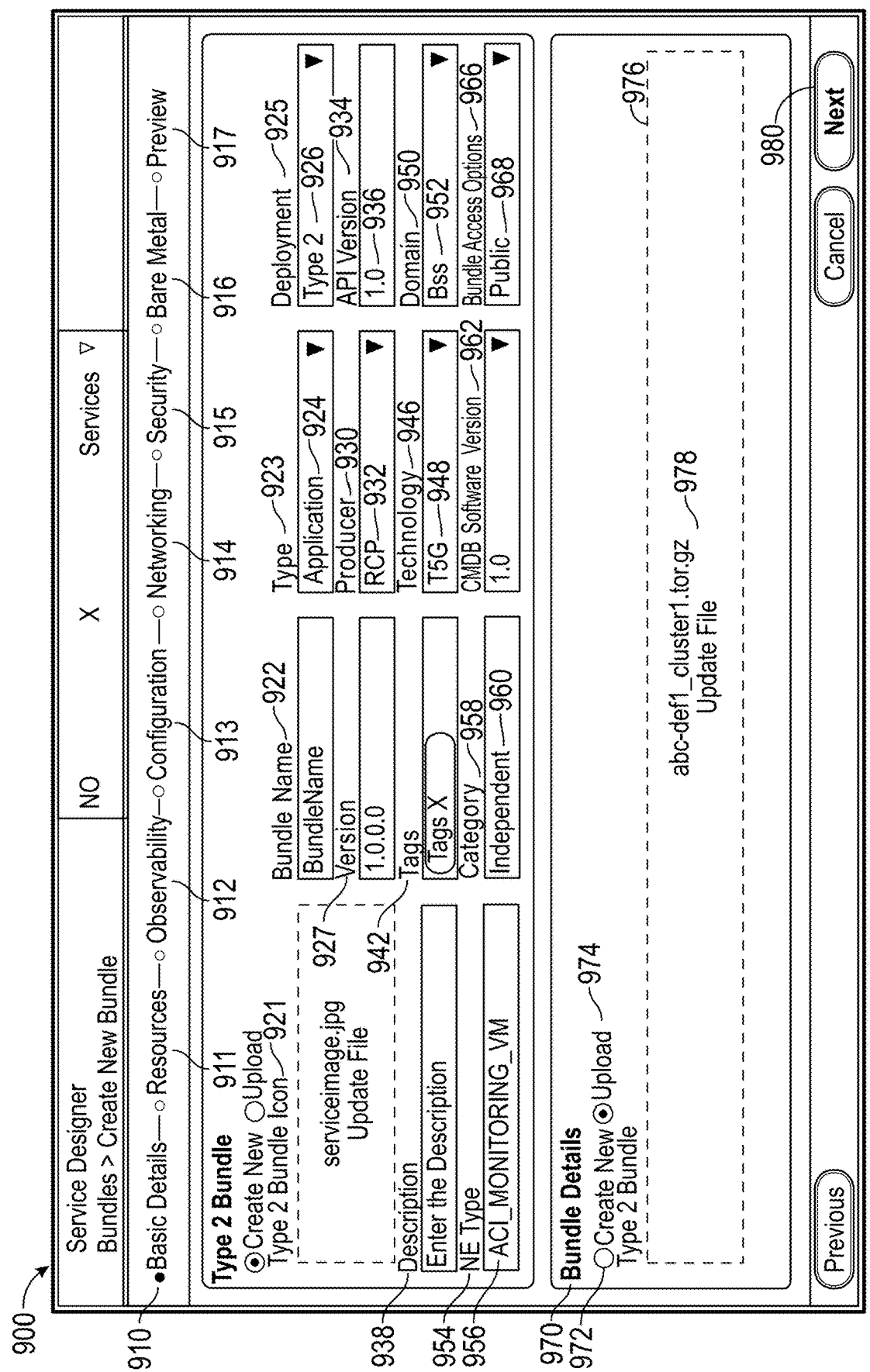
FIG. 9 illustrates a Type 2 Bundle Creation UI according to at least one embodiment.

FIG. 9 illustrates a Type 2 Bundle Creation UI 900 according to at least one embodiment.

In FIG. 9, Type 2 Bundle Creation UI 900 is displayed in response to clicking on Bundle Tab 712 in Artifact Creation UI 700 shown in FIG. 7, and then clicking the "+" Button 758. A Type 2 bundle conforms to industry standards for exposing applications. Type 2 Bundle Creation UI 900 displays stages for the data entry, including Basic Details 910, Resources 911, Observability 912, Configuration 913, Networking 914, Security 915, Bare Metal 916, and a Preview stage 917.

In FIG. 9, Basic Details 910 for a Type 2 Bundle 920 are entered. Data entry for Resources 911, Observability 912, Configuration 913, Networking 914, Security 915, Bare Metal 916 are discussed below with reference to Type 2 Bundle Intake 1420 of FIG. 14. For Basic Details 910, an image is uploaded at area associated with Bundle Icon 821.

In FIG. 9, Basic Details 910 for creating a Type 2 Bundle are entered. In the Bundle Icon area 921, an image is uploaded, e.g., serviceimage.jpg. The Bundle Name Window 922 is used to enter the appropriate name of the bundle. Type Window 923 has a drop-down menu for selecting a bundle type, e.g., Application 924. The Deployment Window 925 has a drop-down menu for choosing Type 2 bundle 926. The Deployment Window 925 has a drop-down menu for choosing Type 1 or Type 2. In FIG. 9, Type 1 926 is chosen.

The Version Window 927 indicates the version of the bundle. The Producer Window 930 has a drop-down menu. Here, RCP 932 is chosen. The API Version Window 934 shows as "1.0" 936. The Description Window 938 includes a brief description of the bundle. Tags Window 942 allows entry of tags for performing lookups and searches.

The Technology Window 946 is a drop-down menu allowing selection of the appropriate technology. Here, T5G 948 is selected indicating the bundle is associated with 5G technology. The Domain Window 950 shows Bss 952 for the domain. The NE Type Window 954 shows ACI_MONITORING_VM 956, which indicates Application Centric Infrastructure (ACI) monitoring of virtual machines. The Category Window 958 indicates Independent 960. Independent 960 is selected in response to there not being any dependency on any other bundle. CMDB Software Version Window 962 indicates the version of the CMDB software. Bundle Access Option Window 966 indicates whether the accessibility of the bundle is public private. Here, Public 968 is selected.

A Bundle Details Window 970 includes a Create New 972 and Upload 974 option. Here, Upload 974 has been selected. A drag and drop area 976 is provided for uploading a Type 2 bundle, e.g., abc-def1_cluster1.tor.gz 978. After the details of the Type 2 Bundle have been entered, Next 980 is selected.

After the details in the Type 2 Bundle Creation UI 900 have been entered, the user then clicks Next 980. After clicking Next 980 a Details Intake UI 1400 as shown below with respect to FIG. 4 is presented, which includes a Type 2 Bundle Intake page 1420 so the user can enter further data or otherwise configure the Type 2 bundle.

Figure 10:
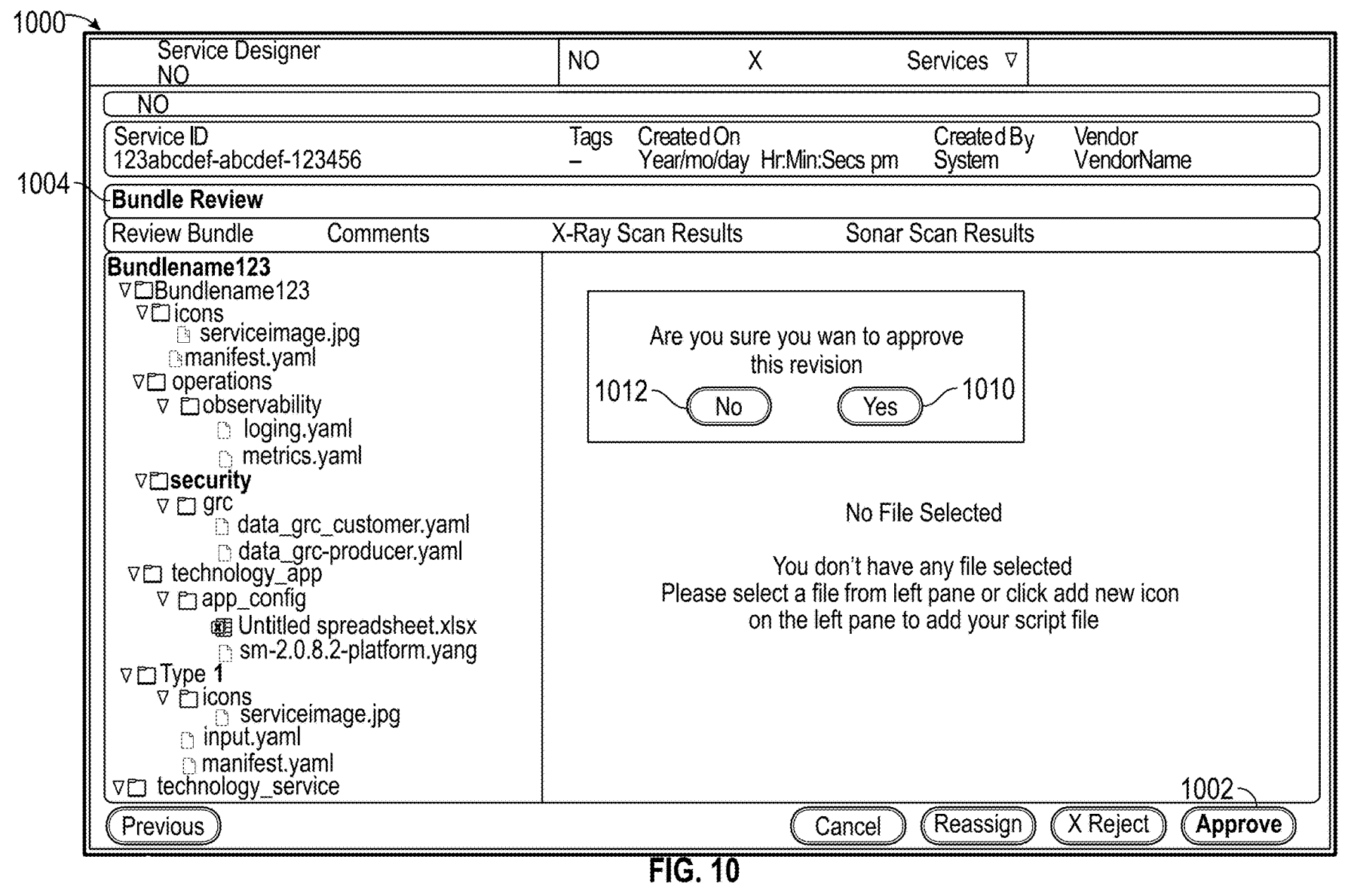

FIG. 10 illustrates a Bundel Review Approval Verification Window 1000 according to at least one embodiment.

In FIG. 10, the user has reviewed the bundle information and has selected the Approve Button 1002 on the Bundle Review UI 1004. The Bundel Review Approval Verification Window 1000 is displayed providing the user the option to select Yes 1010 or No 1012. The user selects Yes 1010 to verify approval of the details in the Bundle Review UI 1004. After the bundle is approved by selecting Yes 1010, the bundle is promoted to Sandbox or Staging Testing depending on the configuration and starts In Test-SBX.

FIG. 11 illustrates trigger deployment from an Updated Bundle Status UI 1100 according to at least one embodiment.

In FIG. 11, Bundles Tab 1102 has been selected and a list of bundles are shown for Service ID 1103 of 123abcdef-abcdef-123456 1104 having a Created On date 1105. Service ID 1103 of 123abcdef-abcdef-123456 1104 has identification of Created By 1106 of System 1107. The Vendor 1108 is identified as VendorName 1109.

For bundle having Bundle Name 1110 of Bundlename123 1120, the Phase 1112 of the bundle is shown as "In Test-SBX" 1132. The Status 1114 shows "Action Required" 1134.

Bundlename123 1120 has a Type 1116 of Type 1 1136, and a Bundle Version 1118 of 1.0.0.0 1138. The Created On date 1130 is 2022/02/01 07:14:07 pm 1140. Bundle having Bundle Name 1110 of r1sontest 1142 has a Type 1116 of Type 2 Bundle 1144.

Approval of bundle details generates a request for pre-production service catalog registration. After pre-production service catalog registration is completed, selection of Kabob Icon 1150 displays Menu 1160 where Trigger Deployment Option 1162 is selected to deploy the bundle.

FIG. 12 illustrates triggering QA scans from an Updated Bundle Status UI 1200 according to at least one embodiment.

In FIG. 12, Bundles Tab 1202 has been selected and a list of bundles are shown for Service ID 1203 of 123abcdef-abcdef-123456 1204 having a Created On date 1205. Service ID 1203 of 123abcdef-abcdef-123456 1204 has identification of Created By 1206 of System 1207. The Vendor 1208 is identified as VendorName 1209.

For bundle having Bundle Name 1210 of Bundlename123 1220, the Phase 1212 of the bundle is shown as "In Test-SBX" 1232. The Status 1214 shows "Action Required" 1234.

Bundlename123 1220 has a Type 1116 of Type 1 1236, and a Bundle Version 1218 of 1.0.0.0 1238. The Created On date 1230 is 2022/02/01 07:14:07 pm 1240. Bundle having Bundle Name 1210 of r1sontest 1242 has a Type 1216 of Type 2 Bundle 1244.

Approval of bundle details generates a request for pre-production service catalog registration. After pre-production service catalog registration is completed, selection of Kabob Icon 1250 displays Menu 1260 where Trigger QA Option 1262 is selected to initiate post-production scans on the bundle.

Figure 13:
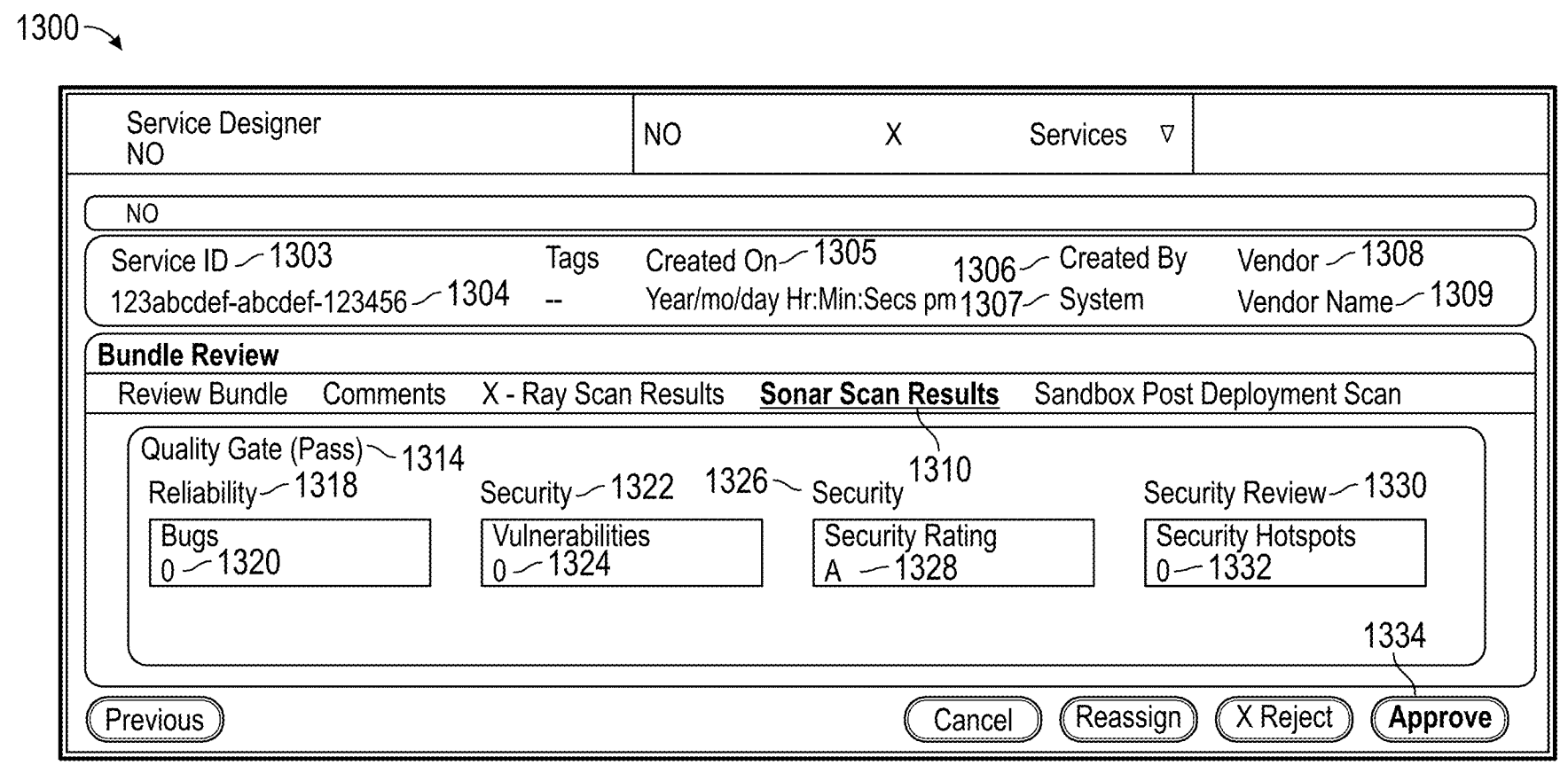

FIG. 13 illustrates a Status Check UI 1300 according to at least one embodiment.

In FIG. 13, Status Check UI 1300 shows that the Sonar Scan Results Tab 1310 has been selected to show sonar scan results for bundle having Service ID 1303 of 123abcdef-abcdef-123456 1304, which has a Created On date 1305. Service ID 1303 of 123abcdef-abcdef-123456 1304 has identification of Created By 1306 of System 1307. The Vendor 1308 is identified as VendorName 1309.

Status Check UI 1300 shows a Quality Gate (Pass) Window 1314. In the Quality Gate Window 1314, a Reliability Window 1318 is shown with "0" bugs 1320 identified. A first Security Window 1322 shows "0" vulnerabilities 1324. A second Security Window 1326 shows a security rating of "A" 1328. A Security Review Window 1330 shows "0" security hotspots 1332. Once the information for the Sonar Scan Results have been reviewed, Approve 1334 is selected.

Figure 14:
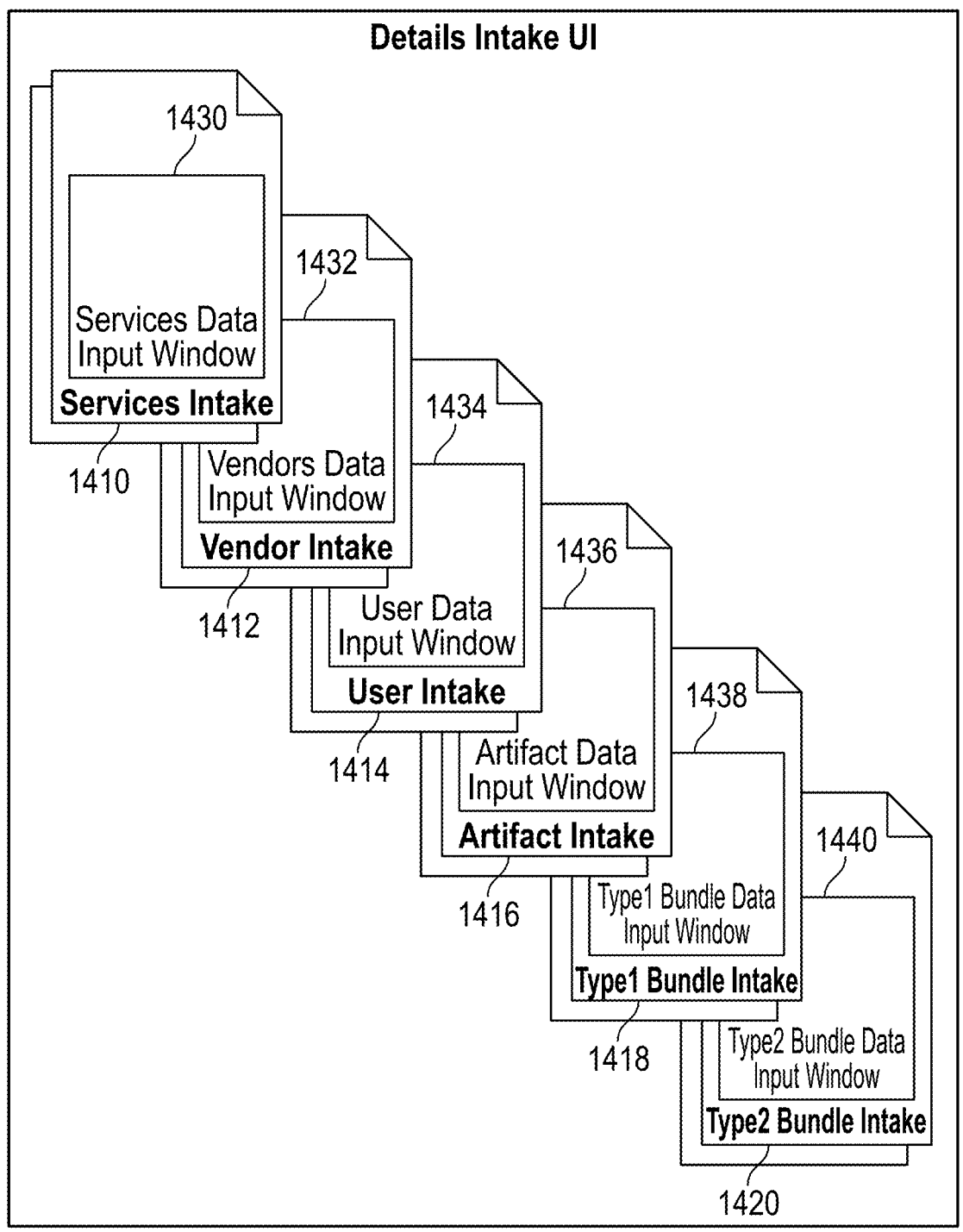
FIG. 14 illustrates a Bundle Component Details Intake Graphic User Interface (GUI) according to at least one embodiment.

FIG. 14 illustrates a Bundle Component Details Intake Graphic User Interface (GUI) 1400 according to at least one embodiment.

As described above with reference to FIG. 2, a user uses Service Designer GUI 200 to access a Dashboard UI 210, a Services Creation UI 212, a Vendor Creation UI 214, a User Creation UI 216, an Artifacts Creation/Upload UI 218, a Bundle Creation UI 220, and a Bundle Deployment and QA Scanning UI 222. Dashboard UI 210 provides options for creation of bundle components, such as services, vendors, users, artifacts and bundles.

From Dashboard UI 210, a user is able to initiate the creations of services by causing Services Creation UI 212 to be displayed, where a selectable component is used to add a new service. From Dashboard UI 210, a user is able to initiate the creations of vendors by causing Vendors Creation UI 214 to be displayed, where a selectable component is used to add a new vendor. Users Creation UI 216 is activated using a menu accessible from Vendors Creation UI 214.

Artifacts Creation/Upload UI 218 is activated from a summary page having selectable tabs including artifacts, wherein a selectable component is used to initiate creation of an artifact. Bundle Creation UI 220 is displayed in response to clicking on a bundle tab in the summary page. From the Bundle Creation UI 220 a user is able to create a new Type 1 bundle or a Type 2 Bundle.

Once creation of a bundle component is initiated from a creation UI, such as Service Creation UI 212, Vendor Creation UI 214, User Creation UI 216, Artifacts Creation/Upload UI 218 and Bundle Creation UI, and initial details are provided in the creation UIs, Details Intake UI 1400 is displayed to enable a user to provide other details for creating a bundle component.

Details Intake UI 1400 presents at least one of Service Intake Page 1410, Vendor Intake Page 1412, User Intake Page 1414, Artifact Intake Page 1416, Type 1 Bundle Intake Page 1418, and Type 2 Bundle Intake Page 1420. Those skilled in the art recognize that, in at least one embodiment, Service Intake Page 1410, Vendor Intake Page 1412, User Intake Page 1414, Artifact Intake Page 1416, Type 1 Bundle Intake Page 1418, and Type 2 Bundle Intake Page 1420 includes more than one page for receiving details for configuring and creating an associated bundle component.

For example, Service Intake Page 1410 includes one or more pages that have a Service Data Input Window 1430 configured to accept details for creating a service. In at least one embodiment, Service Data Input Window 1430 is configured to upload an icon associated with the service to be added. Any appropriate image file is able to upload using different image formats, such as PNG, JPG, etc. Services Data Input Window 1430 is configured to enable a user to enter a service name, to add tags that are useful for performing service name lookup and that enables faster searches, to enter a short description of the service, e.g., Telecom app, Payment App, etc., and to enter the email address, name, vendor associated with an approver, a release manager, a member, and the owner of the service. Information for the approver, release manager, member, and owner of the service is able to be entered, including a role, a provider name, the email address, and name. A service name and description are also able to be entered. Once entry of the details for the service have been completed, the user is able to create the service, where a Service ID, a Created On date, a Created By entry is displayed. From the Service Data Input Window 1412, the user is able to cause a summary to be displayed based on the entered details.

Vendor Intake Page 1412 includes one or more pages that have a Vendor Data Input Window 1432 configured to accept details for creating a vendor. In at least one embodiment, Vendor Data Input Window 1432 is configured to receive the occupation of the vendor, a key associated with the vendor, a website associated with the vendor, and the address, city, state, country, and zip for the vendor. The type of vendor, e.g., partner, is able to be entered via the Vendor Data Input Window 1432. The user is able to preview the information entered using the Vendor Data Input Window 1432. The user is able to view users, edit information about a vendor, and delete a vendor.

User Intake Page 1414 includes one or more pages that have a User Data Input Window 1434 configured to accept details for creating a user. In at least one embodiment, User Data Input Window 1434 is configured to receive information associated with the status, name, email ID, contact, organization, and role of users. The role of the user is Bundle Owner, Bundle Release Manager, Service Designer Admin, and Service Designer Default. User Data Input Window 1434 enables a user to drag-and-drop an image of the user for display or to upload an image file. The user is able to enter a keycloak ID to provide authentication of a user without the user logging in and authenticating with an application.

Artifact Intake Page 1416 includes one or more pages that have an Artifact User Data Input Window 1436 configured to accept details for creating a user. In at least one embodiment, Artifact User Data Input Window 1436 is configured to enable a user to enter the artifact type, e.g., docker image, name of the artifact, tags of the image available on the public docker, and identification of the artifact as pull type of artifact wherein the image is able to be to obtained from a public docker and uploaded, or as a push type or artifact that is able to be uploaded from a local system and pushed to an artifactory in a folder suggested by the system for managing end-to-end onboarding of application bundles.

Artifact User Data Input Window 1436 is also configured to enable a user to enter a source type, e.g., docker hub, the location for the artifact, identification of whether the artifact is auto-enabled, and, if private, a username and password. Through the Artifact User Data Input Window 1436, the user is able to display the status of the artifact, the version, the type (push or pull type), name for the image source, artifact type (docker) and whether authentication is to be used.

Type 1 Bundle Intake Page 1418 includes one or more pages that have a Type 1 Bundle Data Input Window 1438 is configured to accept details for creating a user. In at least one embodiment, Type 1 Bundle Data Input Window 1438, as described above with respect to FIG. 8, accepts data entry, including data entry for Resources 811, Observability 812, Configuration 813, Networking 814, Security 815, Bare Metal 816, and a Preview stage 817. Those skilled in the art recognize that the description of data entry with respect to Type 1 Bundle Data Input Window 1438 is provided as examples and is not meant to limit the embodiments described herein. Type 1 Bundle Data Input Window 1438 is able to be used for entry of additional data, different types of data, or less data than described herein.

Type 1 Bundle Data Input Window 1438 is configured under Resources data entry 811 to receive application details, to receive advanced details including a profile, an indication of whether the snapshot is enabled, whether the bundle is cloned, and if so the method for cloning the bundle, to receive application hooks via a script, and to receive affinity rules, including a name for the affinity rules, a type (e.g., infrastructure), and a target. Type 1 Bundle Data Input Window 1438 presents options for entry of data associated with components, resources, lifecycle, and pre-configured bundles.

Type 1 Bundle Data Input Window 1438 is configured to receive new role details, including the name of the role, a description for the role, and additional role information, including advanced options, security context, labels, annotations, environment variables, affinity rules, IP pools, host aliases, and tolerations.

Type 1 Bundle Data Input Window 1438 is also configured to receive information regarding resources including selection of an image, computer information, storage information, services information, and volume information. Computer information includes memory configuration, a number of cores that are used, and a CPU type. Storage Details includes the storage type, type of storage (e.g., Solid State Drive), the path to storage, and the size of the allocated storage.

Type 1 Bundle Data Input Window 1438 receives service details associated with the Type 1 bundle, including the type (e.g., NodePort), the scope (e.g., a pod), a port area, and a protocol (e.g., TCP). Volume details include the name of the volume, the mount path, the sub-path, and a type for the volume. The user is able to enter a yaml file.

Type 1 Bundle Data Input Window 1438 is configured under Observability data entry 812 to receive receives metrics and logging details. Metrics details includes a name associated with the metrics, match labels, a role name, metric alerts, a description of the metric, a type associated with the metric, an expected range, and an expression for a data format. Logging details include logging labels, identification of a role association with the role, a name for the logging label, a value associated with the role, and a definition for the type of log output Type 1 Bundle Data Input Window 1438 is configured under Configuration data entry 813 to receive configuration data. A user is able to select to add a configuration or a Configuration Management Database (CMDB). Type 1 Bundle Data Input Window 1438 is configured under Networking data entry 814 to received data associated with an API gateway tab and a networking tab. When the API gateway tab is selected, data for a new API gateway is entered. The API gateway data includes a name, a version, and a mediation policy. The mediation policy data includes request-ID-policy-in/policy-out data, a security scheme and security policies, a visibility configuration, an environment for the API, an endpoint URL, a swagger file upload option, a certificate upload choice, a type for the configuration, a tenant name, and an environment.

Type 1 Bundle Data Input Window 1438 is configured under Security data entry 815 to present a GRC producer tab where security data is entered including an indication of whether the GRC producer is a company affiliate, application and/or organization, the application name, an application ID, the application owner email, countries, an applicable industry, application data privacy data, application data backup information, and application data security information. Type 1 Bundle Data Input Window 1438 is configured under Bare Metal data entry 816 to user input to add roles and permission for access management to the bundle, such as integrating keycloak in the bundle and to add performance and fault management policies.

At the preview state, the Type 1 Bundle Data Input Window 1438 presents an option for displaying the details that have been entered.

Type 1 Bundle Data Input Window 1438 is configured to present a Preview 817 that presents the service ID, tags, the created on date, the created by information, and the vendor for the application bundle. Preview 817 provided in the Type 1 Bundle Data Input Window 1438 also presents metric and logging details.

Type 1 Bundle Data Input Window 1438 presents an option for displaying bundle status including the phase, and the status of the pre-deployment scan. The display of the bundle status provided by the Type 1 Bundle Data Input Window 1438 includes a kabob icon for selection of review, Type 1 bundle, and Type 2 Bundle. Selection of the review options presents a bundle review page that includes a Review Bundle Tab, a Comments Tab, an X-Ray Scan Results Tab, and a Sonar Scan Results Tab. X-ray and Sonar scans are downloaded by selecting the X-Ray Scan Results Tab and the Sonar Scan Results Tab. Once the details in the Bundle Data Input Window 1438 are determined to be acceptable, the Type 1 Bundle Data Input Window 1438 presents an approve button for the user to select to approve the bundle.

Upon receiving the approval of the bundle in the Type 1 Bundle Data Input Window 1438, self QA certification data is able to be entered. Self QA certification data includes project name, a description, tags, a start date, an end date, an environment type, a priority, a version associated with the release of the bundle, a release type, the service impacted by the bundle, services affected by the change, a summary of the certificate, the status of the arb, an arb number, and uploaded reports, An activity tab for selection to display log details and for generating a release request. After a release request is created, a "Pre deploy" job is triggered to get the release request status as approved by the technology manager, an "Is Deployable" job, to check whether the bundle is ready to be deployed on the staging environment and registered on the service catalog, where thereafter the bundle then gets deployed and a post-deployment scan is run on the deployed application. A "Post Deployable" job runs to check the release request status as accepted/rejected, and an "Artifacts Transferred Cron" wherein the release request is accepted and the bundle file is moved to production artifactory for deployment on production. Type 1 Bundle Data Input Window 1438 also presents logs associated with a date and time in reverse chronological order (latest shown at the top).

Type 2 Bundle Intake Page 1420 includes one or more pages that have a Type 2 Bundle Data Input Window 1440 configured to accept details for creating a user. In at least one embodiment, Type 2 Bundle Data Input Window 1440, as described above with respect to FIG. 9, accepts data entry, including data entry for Resources 911, Observability 912, Configuration 913, Networking 914, Security 915, Bare Metal 916, and a Preview stage 917. Those skilled in the art recognize that the description of data entry with respect to Type 2 Bundle Data Input Window 1440 is provided as examples and is not meant to limit the embodiments described herein. Type 2 Bundle Data Input Window 1440 is able to be used for entry of additional data, different types of data, or less data than described herein.

Type 2 Bundle Data Input Window 1440 is configured under Resources data entry 911 to display a sandbox area for entry of a size of the memory, a number of CPUs, a storage size, and tags.

Type 2 Bundle Data Input Window 1440 is configured under Observability 912 to receive metrics and logging data. Metrics data includes a name of the metrics, and match labels. Logging data includes a name associated with the logging data, match labels, and a value associated with the logs.

Type 2 Bundle Data Input Window 1440 is configured under Configuration 913 for a user to add a configuration or a Configuration Management Database (CMDB). Under Networking 914, the Type 2 Bundle Data Input Window 1440 present an API gateway tab and a networking tab. When the API gateway tab is selected, data for a new API gateway is entered. The API gateway data includes a name, a version, and a mediation policy. The mediation policy data includes request-ID-policy-in/policy-out data, a security scheme and security policies, a visibility configuration, an environment for the API, an endpoint URL, a swagger file upload option, a certificate upload choice, a type for the configuration, a tenant name, and an environment.

Type 2 Bundle Data Input Window 1440 is configured under Security 915 to present a GRC producer tab where security data is entered including an indication of whether the GRC producer is a company affiliate, application and/or organization, the application name, an application ID, the application owner email, countries, an applicable industry, application data privacy data, application data backup information, and application data security information. Type 1 Bundle Data Input Window 1438 is configured under Bare Metal data entry 816 to user input to add roles and permission for access management to the bundle, such as integrating keycloak in the bundle and to add performance and fault management policies.

At Preview 917, Type 2 Bundle Data Input Window 1440 presents an option for displaying bundle status including the phase, and the status of the pre-deployment scan. The display of the bundle status provided by the Type 2 Bundle Data Input Window 1440 includes a kabob icon for selection of review, Type 1 bundle, and Type 2 Bundle. Selection of the review options presents a bundle review page that includes a Review Bundle Tab, a Comments Tab, an X-Ray Scan Results Tab, and a Sonar Scan Results Tab. X-ray and Sonar scans are downloaded by selecting the X-Ray Scan Results Tab and the Sonar Scan Results Tab. Once the details in the Bundle Review Page 5900 are determined to be acceptable, the Type 2 Bundle Data Input Window 1440 presents an approve button for the user to select to approve the bundle.

Upon receiving the approval of the bundle in the Type 2 Bundle Data Input Window 1440, self QA certification data is able to be entered. Self QA certification data includes project name, a description, tags, a start date, an end date, an environment type, a priority, a version associated with the release of the bundle, a release type, the service impacted by the bundle, services affected by the change, a summary of the certificate, the status of the arb, an arb number, and uploaded reports, FIG. 15 is a flowchart 1500 of a method for managing end-to-end onboarding of application bundles according to at least one embodiment.

Figure 15:
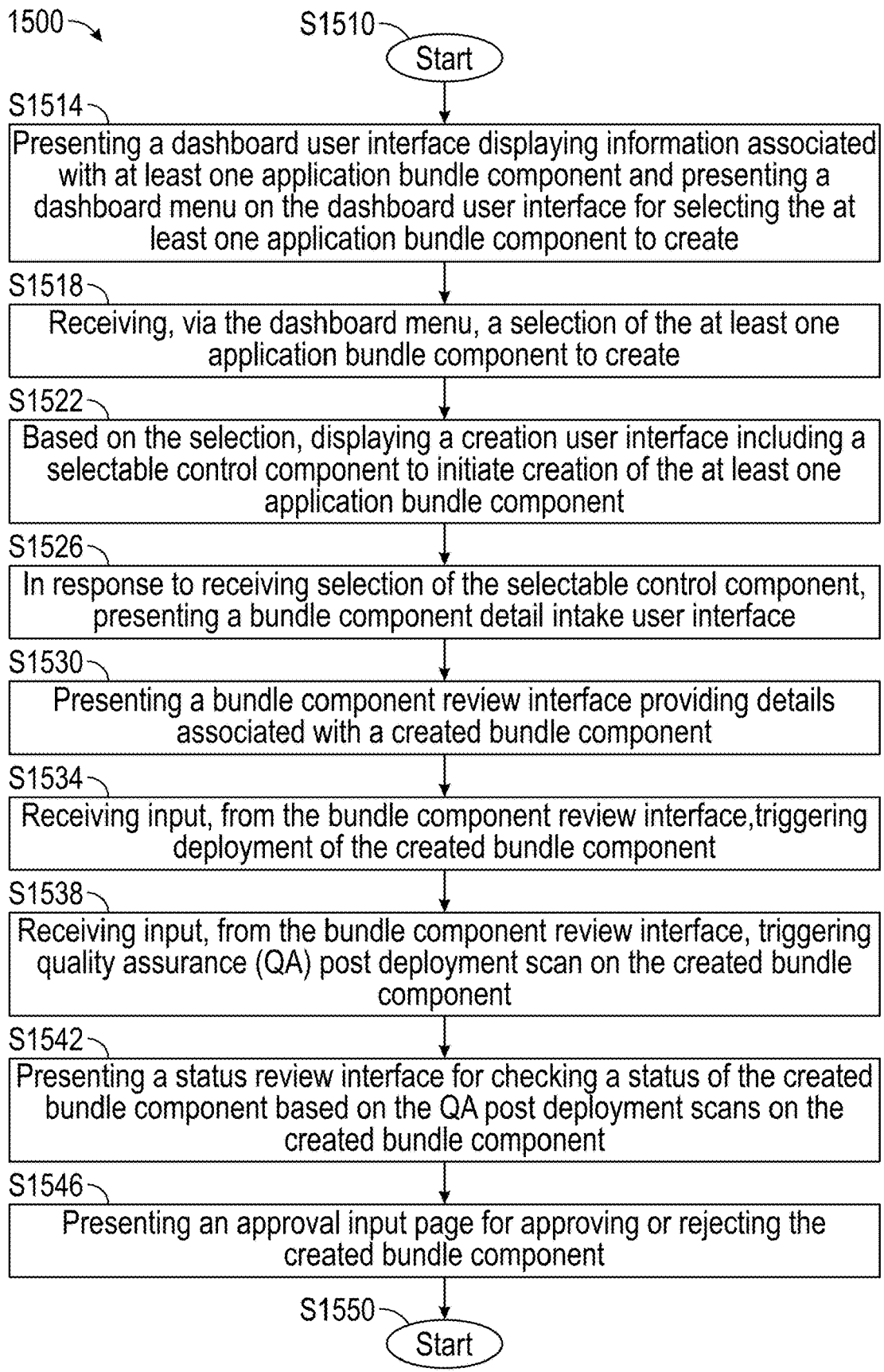
FIG. 15 is a flowchart of a method for managing end-to-end onboarding of application bundles according to at least one embodiment.

In FIG. 15, the method starts S1510 and a dashboard user interface is presented displaying information associated with at least one application bundle component and presenting a dashboard menu on the dashboard user interface for selecting the at least one application bundle component to create S1514. Referring to FIG. 2, Dashboard UI 210 provides options for creation of application bundle components, such as services, vendors, users, artifacts and bundles. Dashboard UI 210 also provides information to the user about the different bundle components. From Dashboard UI 210, a user is able to initiate the creations of services by causing Services Creation UI 212 to be displayed.

A selection of the at least one application bundle component to create is received via the dashboard menu S1518. Referring to FIG. 3, the Dashboard User Interface 300 is accessed from Service Designer 302 and provides a pull-down menu 306 for selecting a bundle component to create Based on the selection, a creation user interface including a selectable control component to initiate creation of the at least one application bundle component is displayed S1522. Referring to FIG. 2, from Dashboard UI 210, a user is able to initiate the creations of services by causing Services Creation UI 212 to be displayed. Services Creation UI 212 displays information about existing services and has a selectable component to add a new service. From Dashboard UI 210, a user is able to initiate the creations of vendors by causing Vendors Creation UI 214 to be displayed. Vendors Creation UI 214 displays information about existing vendors and has a selectable component to add a new vendor.

In response to receiving selection of the selectable control component, a bundle component detail intake user interface is presented S1526. Referring to FIG. 14, once creation of a bundle component is initiated from a creation UI, such as Service Creation UI 212, Vendor Creation UI 214, User Creation UI 216, Artifacts Creation/Upload UI 218 and Bundle Creation UI, and initial details are provided in the creation UIs, Details Intake UI 1400 is displayed to enable a user to provide other details for creating a bundle component.

A bundle component review interface is presented providing details associated with a created bundle component S1530. Referring to FIG. 1, GUI 114 enables a bundle summary to be accessed, including a phase and a status of the bundle. A user of the Onboarding Management Device 110 uses GUI 114 to review new bundles.

Input is received from the bundle component review interface to trigger deployment of the created bundle component S1534. Approval of bundle details generates a request for pre-production service catalog registration. Referring to FIG. 11, after pre-production service catalog registration is completed, selection of Kabob Icon 1150 displays Menu 1160 where Trigger Deployment Option 1162 is selected to deploy the bundle.

Input is received from the bundle component review interface to trigger quality assurance (QA) post deployment scan on the created bundle component S1538. Referring to FIG. 12, approval of bundle details generates a request for pre-production service catalog registration. After pre-production service catalog registration is completed, selection of Kabob Icon 1250 displays Menu 1260 where Trigger QA Option 1262 is selected to initiate post-production scans on the bundle.

A status review interface is presented for checking a status of the created bundle component based on the QA post deployment scans on the created bundle component S1542. Referring to FIG. 13, status Check UI 1300 shows that the Sonar Scan Results Tab 1310 has been selected to show sonar scan results for bundle An approval input page is presented for approving or rejecting the created bundle component S1546. Referring to FIG. 10, the Bundel Review Approval Verification Window 1000 is displayed providing the user the option to select Yes 1010 or No 1012. The user selects Yes 1010 to verify approval of the details in the Bundle Review UI 1004. After the bundle is approved by selecting Yes 1010, the bundle is promoted to Sandbox or Staging Testing depending on the configuration and starts In Test-SBX.

The process then ends S1550.

At least one embodiment for managing end-to-end onboarding of application bundles includes presenting a dashboard user interface displaying information associated with at least one application bundle component and presenting a dashboard menu on the dashboard user interface for selecting the at least one application bundle component to create, receiving, via the dashboard menu, a selection of the at least one application bundle component to create, based on the selection, displaying a creation user interface including a selectable control component to initiate creation of the at least one application bundle component, and in response to receiving selection of the selectable control component, creating the at least one application bundle component.

Figure 16:
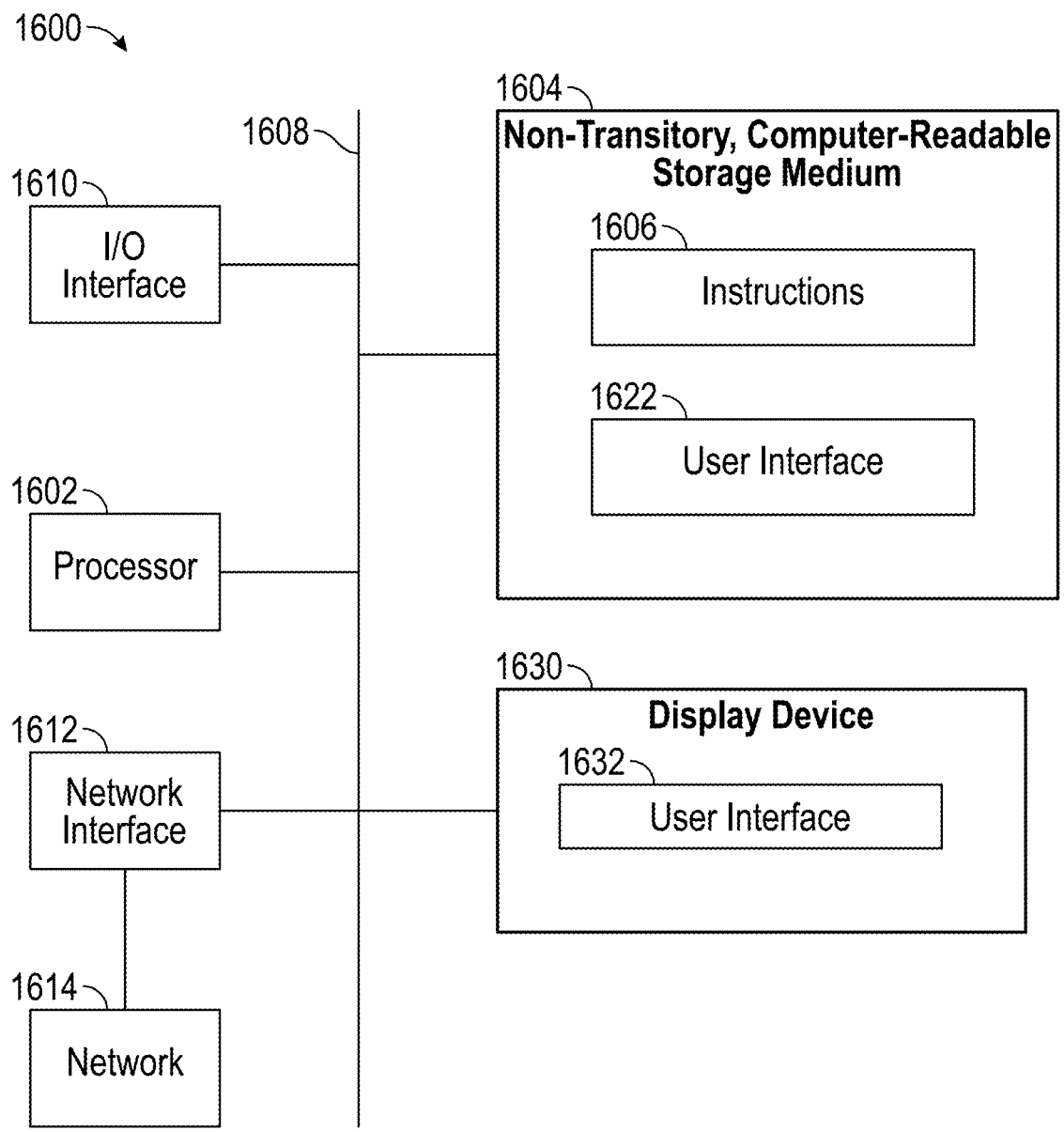
FIG. 16 is a high-level functional block diagram of a Processor-Based System according to at least one embodiment.

FIG. 16 is a high-level functional block diagram of a Processor-Based System 1600 according to at least one embodiment.

In at least one embodiment, Processing Circuitry 1600 provides end-to-end application onboarding. Processing Circuitry 1600 implements an application bundle onboarding management device using Processor 1602. Processing Circuitry 1600 also includes Non-Transitory, Computer-Readable Storage Medium 1604 that is used to implement an application bundle onboarding management device. Storage medium 1604, amongst other things, is encoded with, i.e., stores, Instructions 1606, i.e., computer program code that are executed by Processor 1602 causes Processor 1602 to perform operations for managing end-to-end onboarding of application bundles. Execution of Instructions 1606 by Processor 1602 represents (at least in part) an application bundle onboarding management application which implements at least a portion of the methods described herein in accordance with one or more embodiments (hereinafter, the noted processes and/or methods).

Processor 1602 is electrically coupled to Computer-Readable Storage Medium 1604 via a Bus 1608. Processor 1602 is electrically coupled to an Input/output (I/O) Interface 1610 by Bus 1608. A Network Interface 1612 is also electrically connected to Processor 1602 via Bus 1608. Network Interface 1612 is connected to a Network 1614, so that Processor 1602 and Computer-Readable Storage Medium 1604 connect to external elements via Network 1614. Processor 1602 is configured to execute Instructions 1606 encoded in Computer-Readable Storage Medium 1604 to cause Processing Circuitry 1600 to be usable for performing at least a portion of the processes and/or methods. In one or more embodiments, Processor 1602 is a Central Processing Unit (CPU), a multi-processor, a distributed processing system, an Application Specific Integrated Circuit (ASIC), and/or a suitable processing unit.

Processing Circuitry 1600 includes I/O Interface 1610. I/O Interface 1610 is coupled to external circuitry. In one or more embodiments, I/O Interface 1610 includes a keyboard, keypad, mouse, trackball, trackpad, touchscreen, and/or cursor direction keys for communicating information and commands to Processor 1602.

Processing Circuitry 1600 also includes Network Interface 1612 coupled to Processor 1602. Network Interface 1612 allows Processing Circuitry 1600 to communicate with Network 1614, to which one or more other computer systems are connected. Network Interface 1612 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing Circuitry 1600 is configured to receive information through I/O Interface 1610. The information received through I/O Interface 1610 includes one or more of instructions, data, design rules, libraries of cells, and/or other parameters for processing by Processor 1602. The information is transferred to Processor 1602 via Bus 1608. Processing Circuitry 1600 is configured to receive information, such as from Non-Transitory Computer-Readable Medium 1604. Processor uses User Interface data 1622 from Non-Transitory Computer-Readable Medium 1604 to display User Interface 1632 on Display Device 1630.

In one or more embodiments, one or more Non-Transitory, Computer-Readable Storage Medium 1604 having stored thereon instructions (in compressed or uncompressed form) that may be used to program a computer, processor, or other electronic device) to perform processes or methods described herein. The one or more Non-Transitory, Computer-Readable Storage Medium 1604 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory, Computer-Readable Storage Medium 1604 includes a Compact Disk-Read Only Memory (CD-ROM), a Compact Disk-Read/Write (CD-R/W), and/or a Digital Video Disc (DVD).

In one or more embodiments, Storage Medium 1604 stores Instructions 1606 configured to cause Processing Circuitry 1600 to perform at least a portion of the processes and/or methods for end-to-end application onboarding. In one or more embodiments, Storage Medium 1604 also stores information, such as algorithm which facilitates performing at least a portion of the processes and/or methods for managing end-to-end onboarding of application bundles. Accordingly, in at least one embodiment, the processor circuitry 1600 performs a method for managing end-to-end onboarding of application bundles. The process of includes presenting a dashboard user interface displaying information associated with at least one application bundle component and presenting a dashboard menu on the dashboard user interface for selecting the at least one application bundle component to create, receiving, via the dashboard menu, a selection of the at least one application bundle component to create, based on the selection, displaying a creation user interface including a selectable control component to initiate creation of the at least one application bundle component, and in response to receiving selection of the selectable control component, creating the at least one application bundle component.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art. Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for managing end-to-end onboarding of application bundles, comprising:
   presenting a dashboard user interface displaying information associated with at least one application bundle component and presenting a dashboard menu on the dashboard user interface for selecting the at least one application bundle component to create;
   receiving, via the dashboard menu, a selection of the at least one application bundle component to create;
   based on the selection, displaying a creation user interface including a graphical control element for initiating creation of the at least one application bundle component; and
   in response to receiving activation of the graphical control element, creating the at least one application bundle component;
   wherein creating the at least one application bundle component further comprises presenting at least a bundle component detail intake user interface,
   wherein presenting the bundle component detail intake user interface includes presenting at least one bundle detail intake page for receiving details for creating a bundle,
   wherein the presenting the at least one bundle detail intake page further includes presenting a bundle review interface providing details associated with the bundle, and wherein presenting the bundle review interface further includes further presenting a quality assurance (QA) menu for triggering QA post deployment scans on the bundle, and receiving, via the QA menu, input to trigger execution of the QA post deployment scan on the bundle.

2. The method of claim 1, wherein the creating the at least one application bundle component includes presenting a bundle component detail intake user interface, the presenting the bundle component detail intake user interface further includes presenting:
    at least one service detail intake page for receiving details for creating a service;
    at least one vendor detail intake page for receiving details for creating a vendor;
    at least one user detail intake page for receiving details for creating a user; or
    at least one artifact detail intake page for receiving details for creating an artifact.

3. The method of claim 1, wherein the presenting the bundle review interface further includes presenting a bundle deployment menu for deploying the bundle, and receiving, via the bundle deployment menu, input triggering deployment of the bundle.

4. The method of claim 1, wherein, in response to receiving the input to trigger the execution of the QA post deployment scan on the bundle, presenting a bundle status review interface for checking a status of the bundle based on the execution of the QA post deployment scans on the bundle.

5. The method of claim 1, wherein the presenting the bundle review interface further includes presenting an approval input page and receiving input on the approval input page for approving or rejecting the bundle.

6. A device for managing end-to-end onboarding of application bundles comprising: a memory storing computer-readable instructions; and a processor connected to the memory, wherein the processor is configured to execute the computer-readable instructions to:
    present a dashboard user interface displaying information associated with at least one application bundle component and present a dashboard menu on the dashboard user interface for selecting the at least one application bundle component to create;
    receive, via the dashboard menu, a selection of the at least one application bundle component to create;
    based on the selection, display a creation user interface including a graphical control element for initiating creation of the at least one application bundle component; and
    in response to receiving activation of the graphical control element, create the at least one application bundle component;
    wherein creating the at least one application bundle component further comprises presenting at least a bundle component detail intake user interface,
    wherein presenting the bundle component detail intake user interface includes presenting at least one bundle detail intake page for receiving details for creating a bundle,
    wherein the presenting the at least one bundle detail intake page further includes presenting a bundle review interface providing details associated with the bundle, and
wherein presenting the bundle review interface further includes further presenting a quality assurance (QA) menu for triggering QA post deployment scans on the bundle, and receiving, via the QA menu, input to trigger execution of the QA post deployment scan on the bundle.

7. The device of claim 6, wherein the processor is further configured to create the at least one application bundle component by presenting a bundle component detail intake user interface, wherein the bundle component detail user interface includes:
    at least one service detail intake page for receiving details for creating a service;
    at least one vendor detail intake page for receiving details for creating a vendor;
    at least one user detail intake page for receiving details for creating a user;
    at least one artifact detail intake page for receiving details for creating an artifact.

8. The device of claim 6, wherein the bundle review interface further includes a bundle deployment menu for deploying the bundle, wherein input triggering deployment of the bundle is received via the bundle deployment menu.

9. The device of claim 6, wherein the bundle review interface further includes a quality assurance (QA) menu for triggering QA post deployment scans on the bundle, wherein input to trigger execution of the QA post deployment scan on the bundle is received via the QA menu.

10. The device of claim 6, wherein, in response to receiving input to trigger the execution of the QA post deployment scan on the bundle, wherein a bundle status review interface is presented for checking a status of the bundle based on the execution of the QA post deployment scans on the bundle.

11. The device of claim 6, wherein the bundle review interface further includes an approval input page, wherein input is received on the approval input page for approving or rejecting the bundle.

12. A non-transitory computer-readable media having computer-readable instructions stored thereon, which when executed performs operations comprising:
    presenting a dashboard user interface displaying information associated with at least one application bundle component and presenting a dashboard menu on the dashboard user interface for selecting the at least one application bundle component to create;
    receiving, via the dashboard menu, a selection of the at least one application bundle component to create;
    based on the selection, displaying a creation user interface including a graphical control element for initiating creation of the at least one application bundle component; and
    in response to receiving activation of the graphical control element, creating the at least one application bundle component;
    wherein creating the at least one application bundle component further comprises presenting at least a bundle component detail intake user interface,
    wherein presenting the bundle component detail intake user interface includes presenting at least one bundle detail intake page for receiving details for creating a bundle,
    wherein the presenting the at least one bundle detail intake page further includes presenting a bundle review interface providing details associated with the bundle, and
    wherein presenting the bundle review interface further includes further presenting a quality assurance (QA) menu for triggering QA post deployment scans on the bundle, and receiving, via the QA menu, input to trigger execution of the QA post deployment scan on the bundle.

13. The non-transitory computer-readable media of claim 12, wherein the creating the at least one application bundle component includes presenting a bundle component detail intake user interface, the presenting the bundle component detail user interface includes presenting:
   at least one service detail intake page for receiving details for creating a service;
   at least one vendor detail intake page for receiving details for creating a vendor;
   at least one user detail intake page for receiving details for creating a user;
   at least one artifact detail intake page for receiving details for creating an artifact.

14. The non-transitory computer-readable media of claim 12, wherein the presenting the bundle review interface further includes presenting a bundle deployment menu for deploying the bundle, and receiving, via the bundle deployment menu, input triggering deployment of the bundle.

15. The non-transitory computer-readable media of claim 12, wherein the presenting the bundle review interface further includes presenting an approval input page and receiving input on the approval input page for approving or rejecting the bundle.

* * * * *